March 2, 1926.
T. C. McKINLEY
DRAWING SHEET GLASS
Filed Nov. 5, 1923
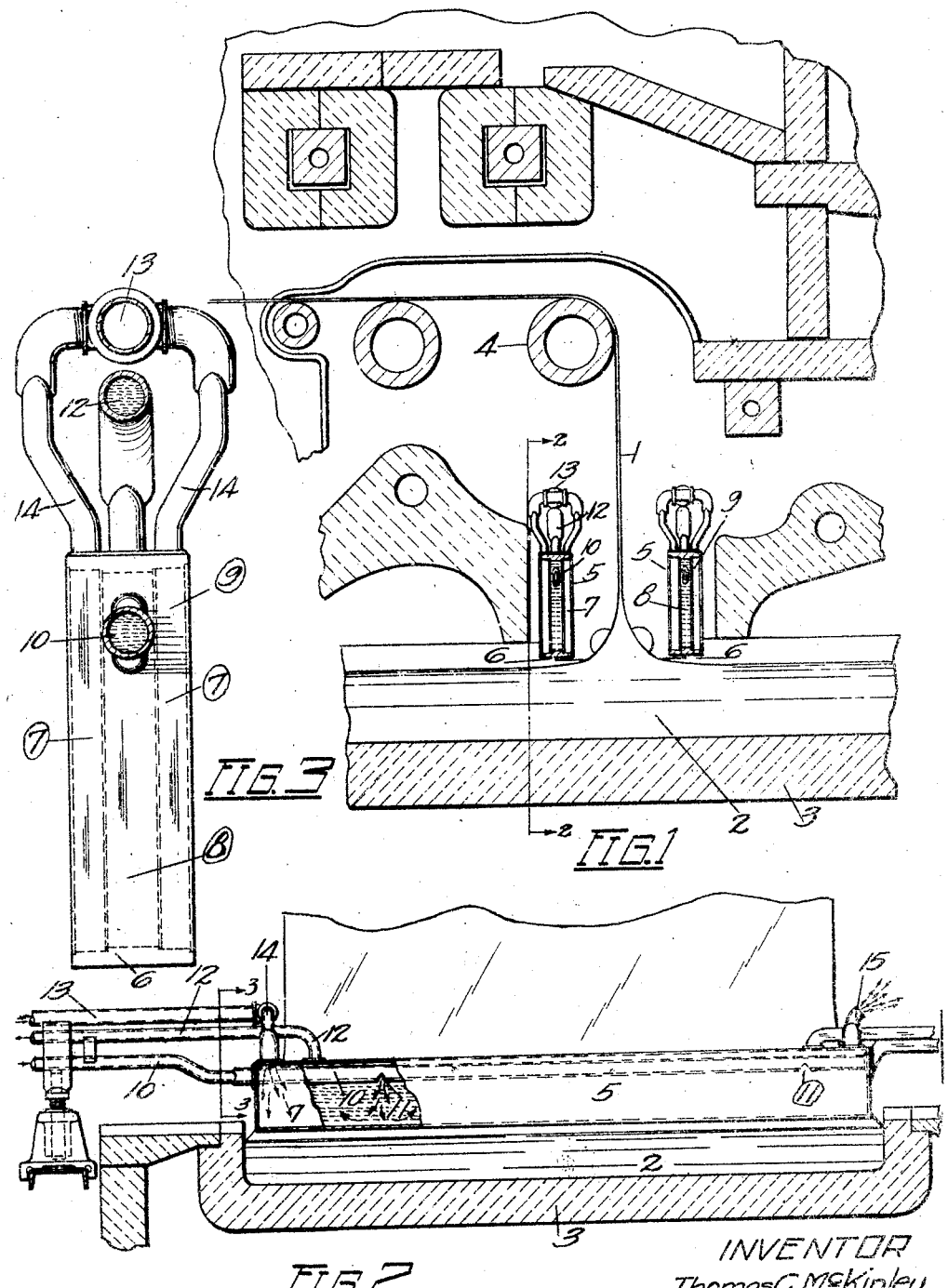
INVENTOR
Thomas C. McKinley
BY C. A. Rowley
ATTORNEY Patented Mar. 2, 1926.

1,574,984

UNITED STATES PATENT OFFICE.

THOMAS C. McKINLEY, OF CHARLESTON, WEST VIRGINIA, ASSIGNOR TO THE LIBBEY-OWENS SHEET GLASS COMPANY, OF TOLEDO, OHIO, A CORPORATION OF OHIO.

DRAWING SHEET GLASS.

Application filed November 5, 1923. Serial No. 672,801.

*To all whom it may concern:*

Be it known that I, THOMAS C. McKINLEY, a citizen of the United States, residing at Charleston, in the county of Kanawha and State of West Virginia, have invented new and useful Improvements in Drawing Sheet Glass, of which the following is a specification.

This invention relates to improvements in the art of drawing sheet glass, and more particularly to an improved form of cooler or internally cooled shield for use in controlling the temperature of the glass at the sheet source.

In the Colburn process of drawing sheet glass, as set forth more particularly in the patent granted to I. W. Colburn, 1,248,809, December 4, 1917, a sheet of glass is drawn upwardly from a shallow pool of molten glass, and in order to control the temperature of the molten glass at the sheet source and quickly chill the same to permit a more rapid rate of drawing of the sheet, a pair of water coolers is mounted parallel to, and one at each side of the sheet and closely adjacent to the molten glass from which the sheet is drawn. These coolers are of a rectangular cross-section with their narrow lower faces positioned as closely as possible to the upper surface of the pool of molten glass and their inner vertical faces arranged parallel to the sides of the sheet and spaced a few inches therefrom. These coolers function to cool the surface glass just prior to its being drawn upwardly into the surfaces of the sheet, and also function to cool the surfaces of the drawn sheet and to shield the same from the hot air currents which might otherwise come into contact with the forming sheet.

The cooler now in use is formed of a thin metallic casing, and a constant stream of cold water is passed therethrough. A great deal of trouble has been caused at times by the condensation of water on the outer vertical sides of these coolers.

The object of the present invention is to so modify the cooler body that this condensation trouble will be avoided. In the improved form of cooler hereinafter described, this is accomplished by providing hollow compartments or air-jackets along the two vertical sides of the water compartments so that the cooling effect of these portions of the apparatus will be tempered to such an extent that the condensation on the exterior walls will not take place.

The objects and advantages of this invention will be better understood from the following detailed description of one approved form of the apparatus.

In the accompanying drawings:

Fig. 1 is a vertical longitudinal section through a portion of the sheet drawing apparatus, showing the improved coolers in transverse vertical section.

Fig. 2 is a transverse vertical section, taken substantially on the line 2—2 of Fig. 1, through the sheet drawing apparatus showing one of the coolers in side elevation, portions of the cooler being broken away to disclose its interior construction.

Fig. 3 is an end elevation, on an enlarged scale, of one of the coolers, the feed pipes being shown in section, taken substantially on the line 3—3 of Fig. 2.

The glass sheet 1 is drawn upwardly from the pool of molten glass 2 in receptacle 3, and is then deflected about bending roller 4 into the horizontal plane, where it is carried off through suitable flattening and annealing apparatus. All this is substantially as disclosed in the Colburn patent referred to above. The two coolers 5 are arranged parallel to the sheet adjacent its source with their bottom edges 6 closely adjacent to the upper surface of the pool of molten glass 2. It is to be understood that these improved coolers, as hereinafter described, might be used equally well in other forms of glass working apparatus than that above described.

Each cooler body is divided by a pair of parallel vertical interior partitions 7 into a series of three narrow compartments entirely separated from one another. Preferably, the central compartment 8 is of greater capacity than the two side compartments 9.

It is through the central compartment 8 that the current of cooling water or other liquid is passed. A pipe 10 passes through one end wall of the casing and extends substantially throughout the length of the upper portion of chamber 8. The cold water passes in through this pipe 10 and emerges into the compartment 8 through a plurality of openings 11. A second pipe 12 connects through the upper wall of chamber 8 adjacent one end thereof, and it is through this pipe that the water passes out. It will be noted that this water-cooled chamber 8 is in direct contact with the bottom wall 6 of the cooler so that the maximum chilling effect may be exerted along this wall of the cooler upon the molten glass therebeneath.

A third pipe 13, through which air is forced in, communicates through a manifold 14 with one end of each of the side compartments 9. This air is allowed to escape from the other end of these compartments through the outlet manifold 15 adjacent the opposite end thereof. These blankets of air in the two side compartments 9 act as a tempering medium between the cold water in the interior chamber 8 and the heated atmosphere outside of the cooler, so that only a modified chilling effect is exerted along the vertical side walls of the cooler and the condensation of water on these surfaces will be largely avoided. At the same time the maximum chilling effect of the cooler along its bottom surface, where most desired, is not interfered with. The cooler also functions as an effective shield against the hot air currents tending to flow against the sheet source, from within the furnace.

Claims:

1. A cooler for use in sheet glass drawing apparatus comprising a hollow casing having a plurality of compartments, means for passing air through the compartment closest to the sheet being drawn, and means for passing a cooling fluid through the remaining compartments.

2. A cooler for use in a sheet-glass drawing apparatus, comprising a hollow metallic casing, having a plurality of longitudinally extending interior chambers, and means for maintaining a flow of cooling fluid through one of the chambers, and a flow of air through another.

3. A cooler for use in a sheet-glass drawing apparatus, comprising a substantially rectangularly hollow metallic casing, having a plurality of longitudinally extending interior chambers, and means for maintaining a flow of cooling fluid through one of the chambers, and a flow of air through another.

4. A cooler for use in a sheet-glass drawing apparatus, comprising a substantially rectangularly hollow metallic casing, divided by a pair of vertical interior partitions into three longitudinally extending compartments, means for maintaining a flow of cooling fluid through the interior compartment, and means for maintaining a flow of air through the two side compartments.

5. A cooler for use in a sheet-glass drawing apparatus, comprising a substantially rectangularly hollow metallic casing, means within the casing for water-cooling the bottom thereof, and air-jackets between the water-cooling means and the vertical side-walls of the casing.

6. A cooler for use in a sheet-glass drawing apparatus, comprising a substantially rectangularly hollow metallic casing, means within the casing for water-cooling the bottom thereof, hollow compartments between the water-cooling means and the vertical side walls of the casing, and means for maintaining a flow of air through these compartments.

Signed at Charleston, in the county of Kanawha, and State of West Virginia, this 29th day of October, 1923.

THOMAS C. McKINLEY.